(12) United States Patent
Naik et al.

(10) Patent No.: US 11,828,402 B2
(45) Date of Patent: Nov. 28, 2023

(54) VACUUM ASSISTED AND HEATED AUGER FEEDER FOR ACHIEVING HIGHER PACKING EFFICIENCY OF POWDER INSULATION MATERIALS IN VACUUM INSULATED STRUCTURES

(71) Applicant: WHIRLPOOL CORPORATION, Benton Harbor, MI (US)

(72) Inventors: Abhay Naik, Stevensville, MI (US); Ashish Nigam, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/876,024

(22) Filed: Jul. 28, 2022

(65) Prior Publication Data

US 2022/0364674 A1   Nov. 17, 2022

Related U.S. Application Data

(63) Continuation of application No. 16/652,650, filed as application No. PCT/US2017/058529 on Oct. 26, 2017, now Pat. No. 11,435,023.

(51) Int. Cl.
| | |
|---|---|
| *F16L 59/065* | (2006.01) |
| *F25D 23/06* | (2006.01) |
| *F26B 5/04* | (2006.01) |

(52) U.S. Cl.
CPC .......... *F16L 59/065* (2013.01); *F25D 23/062* (2013.01); *B32B 2307/304* (2013.01); *B32B 2509/10* (2013.01); *F25D 23/066* (2013.01); *F25D 2201/1262* (2013.01); *F25D 2201/14* (2013.01); *F25D 2323/021* (2013.01); *F26B 5/04* (2013.01)

(58) Field of Classification Search
None
See application file for complete search history.

(56) References Cited

U.S. PATENT DOCUMENTS

| | | |
|---|---|---|
| 3,597,850 A | 8/1971 | Jenkins |
| 3,875,683 A | 4/1975 | Waters |
| 4,183,702 A | 1/1980 | Bonnel |
| 5,319,946 A | 6/1994 | Manificat |
| 5,509,248 A | 4/1996 | Dellby et al. |
| 5,989,371 A | 11/1999 | Nishimoto |
| 6,163,976 A | 12/2000 | Tada et al. |
| 6,955,196 B2 | 10/2005 | Giudici et al. |

(Continued)

FOREIGN PATENT DOCUMENTS

| | | |
|---|---|---|
| CN | 1081991 A | 2/1994 |
| CN | 1102612 A | 5/1995 |

(Continued)

*Primary Examiner* — Alexander S Thomas
(74) *Attorney, Agent, or Firm* — Price Heneveld LLP

(57) ABSTRACT

An auger feeder includes a hopper having an inner hopper wall and an outer hopper wall where the inner hopper wall includes an air permeable surface. A space is positioned between the inner and outer hopper walls. A heater is coupled to an outside edge of the inner hopper wall or a n outside edge of the outer hopper wall while a feed screw is positioned along an inside edge of the inner hopper wall. The auger feeder additionally includes an evacuator coupled to a vacuum port that is positioned in the outer hopper wall. The auger feeder also includes an aperture exit positioned at a bottom of the inner and outer hopper walls.

20 Claims, 8 Drawing Sheets

(56) References Cited

U.S. PATENT DOCUMENTS

| | | | |
|---|---|---|---|
| 7,234,247 | B2 | 6/2007 | Maguire |
| 7,517,576 | B2 | 4/2009 | Echigoya et al. |
| 7,703,217 | B2 | 4/2010 | Tada et al. |
| 8,776,390 | B2 | 7/2014 | Hanaoka et al. |
| RE45,501 | E | 5/2015 | Maguire |
| 2017/0157809 | A1 | 6/2017 | Deka et al. |
| 2017/0159997 | A1 | 6/2017 | Allo et al. |

FOREIGN PATENT DOCUMENTS

| | | | |
|---|---|---|---|
| CN | 1191959 | A | 9/1998 |
| CN | 1666072 | A | 9/2005 |
| CN | 1760582 | A | 4/2006 |
| CN | 101017053 | A | 8/2007 |
| CN | 101549790 | A | 10/2009 |
| CN | 201567087 | U | 9/2010 |
| CN | 202389972 | U | 8/2012 |
| CN | 203111844 | U | 8/2013 |
| CN | 204037926 | U | 12/2014 |
| CN | 204400010 | U | 6/2015 |
| CN | 205818238 | U | 12/2016 |
| CN | 106390555 | A | 2/2017 |
| CN | 206417230 | U | 8/2017 |
| DE | 2754394 | A1 | 6/1978 |
| JP | H049582 | A | 1/1992 |
| JP | 2000313526 | A | 11/2000 |
| JP | 2011084311 | A | 4/2011 |
| JP | 2017095211 | A | 6/2017 |

VACUUM ASSISTED AND HEATED AUGER FEEDER FOR ACHIEVING HIGHER PACKING EFFICIENCY OF POWDER INSULATION MATERIALS IN VACUUM INSULATED STRUCTURES

CROSS-REFERENCE TO RELATED APPLICATIONS

This application is a continuation of U.S. patent application Ser. No. 16/652,650, now U.S. Pat. No. 11,435,023, filed Mar. 31, 2020, and entitled "VACUUM ASSISTED AND HEATED AUGER FEEDER FOR ACHIEVING HIGHER PACKING EFFICIENCY OF POWDER INSULATION MATERIALS IN VACUUM INSULATED STRUCTURES," which is a National Stage Application under 35 U.S.C. § 371 of International Application No. PCT/US2017/058529, filed on Oct. 26, 2017, entitled "VACUUM ASSISTED AND HEATED AUGER FEEDER FOR ACHIEVING HIGHER PACKING EFFICIENCY OF POWDER INSULATION MATERIALS IN VACUUM INSULATED STRUCTURES," the entire disclosure of which is hereby incorporated herein by reference.

FIELD OF THE DISCLOSURE

The present disclosure generally relates to producing insulated structures, and more particularly, to a vacuum heated auger used to fill the vacuum cavities of a vacuum insulated structure.

BACKGROUND OF THE DISCLOSURE

Refrigerators and freezers may account for a significant percentage of total residential energy usage. Technological advances in compressors, thermal insulation, heat exchangers, motors, and fans have increased the energy efficiency in refrigerators. Although incremental gains through continuous improvements in component technologies and system optimizations may be possible, the industry needs major technology breakthroughs to meet the ever-changing energy standards.

Refrigerator cabinets including vacuum insulation panels (VIPs) have been developed. VIPs may include low thermal conductivity core materials that are vacuum sealed in an envelope made of composite barrier films. VIPs may be placed inside cabinet walls with polyurethane foam insulation. Thanks to the advances in the last two decades in barrier films, core materials, and manufacturing technologies, VIP technology is slowly becoming a commercially viable solution for improving the energy efficiency of a refrigerator, even though there are still many problems that must be addressed in order for the insulation technology to reach its fullest potential in the refrigerator and freezer markets.

SUMMARY

According to one aspect of the present disclosure, an auger feeder is provided. The auger feeder includes a hopper having an inner hopper wall and an outer hopper wall wherein the inner hopper wall includes an air permeable surface, a space positioned between the inner and outer hopper walls, and a heater coupled to an outside edge of the inner hopper wall or an outside edge of the outer hopper wall. The auger feeder further includes a feed screw positioned along an inside edge of the inner hopper wall, an evacuator coupled to a vacuum port positioned in the outer hopper wall, and an aperture exit positioned at the bottom of the inner and outer hopper walls.

According to another aspect of the present disclosure, a method for drying and loading a filler insulation material into a vacuum insulated structure is provided. The method includes providing an auger feeder. The auger feeder includes a hopper having an inner hopper wall and an outer hopper wall wherein the inner hopper wall includes an air permeable surface, a space positioned between the inner and outer hopper walls, a heater coupled to an outside edge of the inner hopper wall or an outside edge of the outer hopper wall, a feed screw positioned along an inside edge of the inner hopper wall, an evacuator coupled to a vacuum port positioned in the outer hopper wall, and an aperture exit positioned at the bottom of the inner and outer hopper walls. The method further includes loading the vacuum insulation material to the hopper, mixing the vacuum insulation material with the feed screw, applying heat and a first vacuum to the vacuum insulation material to form a dry and degassed vacuum insulation material, loading the dry and degassed vacuum insulation material into the vacuum insulated structure through the aperture exit and a loading port, removing the auger feeder and applying a second vacuum to the loading port of the vacuum insulated structure, and sealing the loading port to form the vacuum insulated structure.

According to another aspect of the present disclosure, an apparatus for drying and loading a filler insulation material into a vacuum insulated structure is provided. The apparatus includes a hopper having an inner hopper wall and an outer hopper wall wherein the inner hopper wall includes an air permeable surface, a space positioned between the inner and outer hopper walls, and a heater coupled to an outside edge of the inner hopper wall or an outside edge of the outer hopper wall. The apparatus further includes a feed screw positioned along an inside edge of the inner hopper wall, an evacuator coupled to a vacuum port positioned in the outer hopper wall, and an aperture exit positioned at the bottom of the inner and outer hopper walls.

These and other features, advantages, and objects of the present device will be further understood and appreciated by those skilled in the art upon studying the following specification, claims, and appended drawings.

DETAILED DESCRIPTION OF EMBODIMENTS

Figure 1:
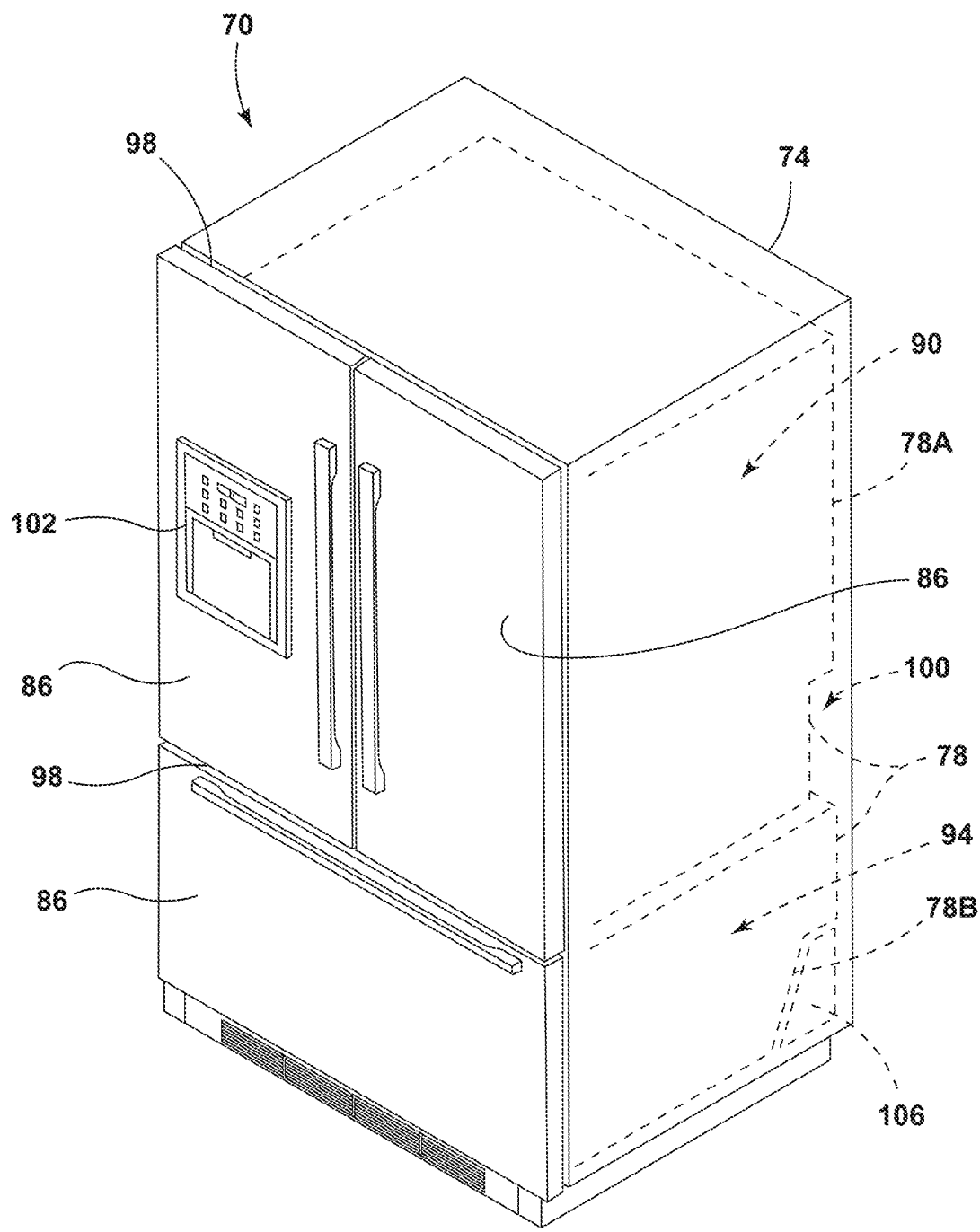
FIG. 1 is a front isometric view of a refrigerator including a vacuum insulated cabinet structure according to one aspect of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-7, an auger feeder 10 includes a hopper 14 having an inner hopper wall 18 and an outer hopper wall 22 where the inner hopper wall 18 includes an air permeable surface 26. A space 30 is positioned between the inner and outer hopper walls 18, 22. A heater 34 is coupled to an outside edge 38 of the inner hopper wall 18 or an outside edge 42 of the outer hopper wall 22 while a feed screw 46 is positioned along an inside edge 50 of the inner hopper wall 18. The auger feeder 10 additionally includes an evacuator coupled to a vacuum port 58 that is positioned in the outer hopper wall 22. The auger feeder 10 also includes an aperture exit 62 positioned at a bottom 66 of the inner and outer hopper walls 18, 22.

Referring now to FIG. 1, a vacuum insulated structure 70 includes a wrapper 74, a liner 78, and a thermal bridge 82 (FIG. 2) that interconnects the wrapper 74 and liner 78. The liner 78 may include a single, one-piece liner, or the liner 78 may include two or more components such as a refrigerator liner 78a and a freezer liner 78b. The vacuum insulated refrigerator structure 70 depicted in FIG. 1 is a French door bottom mount refrigerator, but it will be understood that this disclosure may equally be applied to freezers, walk in coolers, and the like, without departing from the teachings provided herein. The vacuum insulated structure 70 may include one or more appliance doors 86 which may be opened to allow users of the vacuum insulated structure 70 to place or remove items from within a refrigerator compartment 90 and/or a freezer compartment 94 through one or more access openings 98. A cavity 100 is formed in the space located between the wrapper 74 and the liner 78 where an insulation material may be added as described below.

A refrigeration system 106 cools the refrigerator compartment 90 and/or the freezer compartment 94. The refrigeration system 106 may comprise a known system including a compressor, condenser, expansion valve, evaporator, conduits, and other related components (not shown). Alternatively, the refrigeration system 106 may comprise thermal electric components (not shown), or other suitable arrangements depending on the desired use or application.

Figure 2:
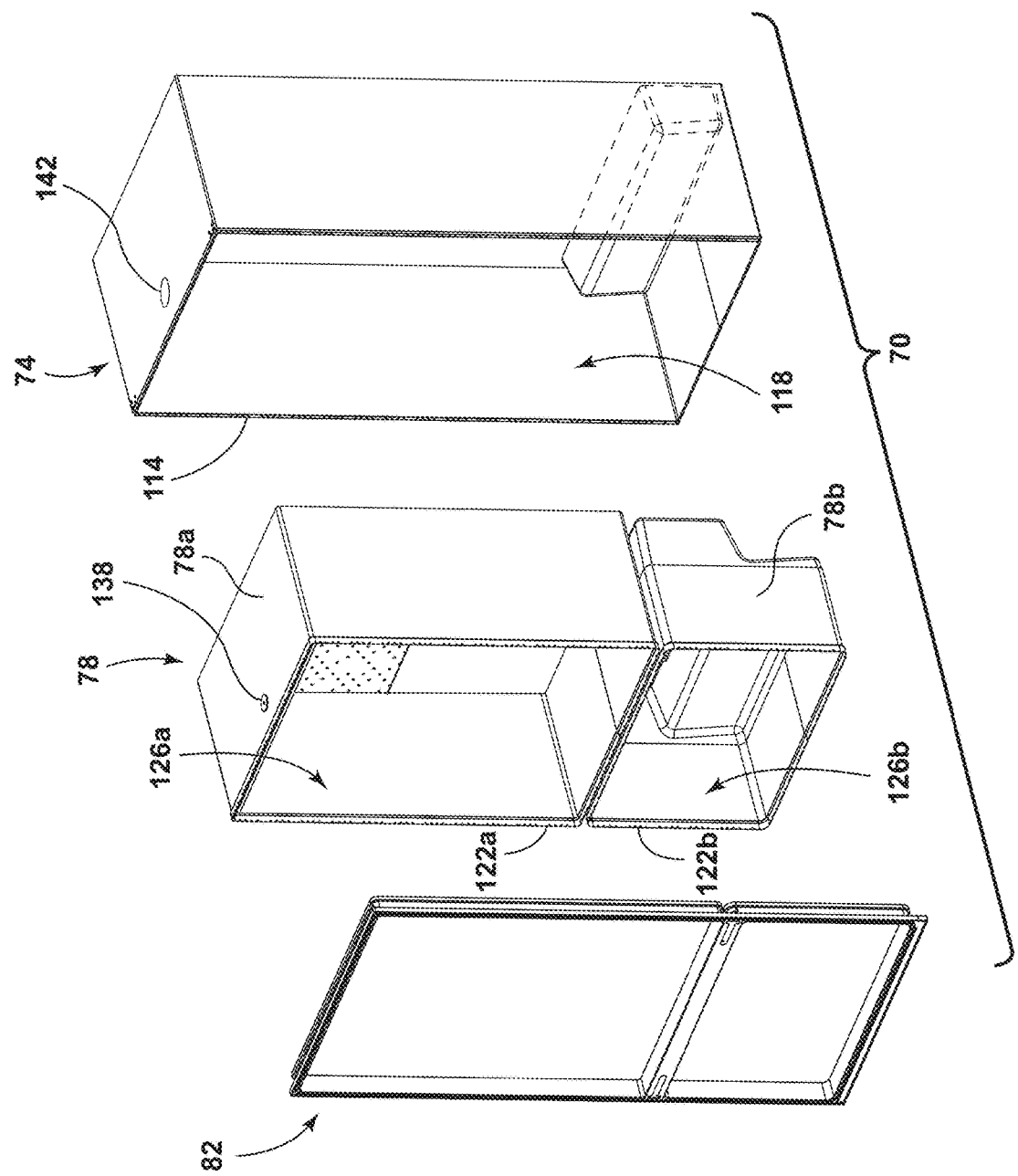
FIG. 2 is an exploded side isometric view of the refrigeration structure according to one aspect of the present disclosure.

Referring now to FIG. 2, the vacuum insulated structure 70 when assembled (FIG. 1), includes the liners 78, both the refrigerator liner 78a and the freezer liner 78b, disposed in the wrapper 74 therein. The wrapper 74 and the liner 78 (or liners 78a and 78b) are coupled to the insulating thermal bridge 82. The wrapper 74 is connected to the insulating thermal bridge 82 at a first edge 114. The first edge 114 extends around/surrounds a first opening 118 of the wrapper 74. Refrigerator liner 78a and the freezer liner 78b include second edges 122a and 122b, respectively, surrounding second openings 126a and 126b, respectively, representing the refrigerator and freezer compartments 90, 94. The second edges 122a and 122b are coupled to the insulating thermal bridge 82.

Figure 3:
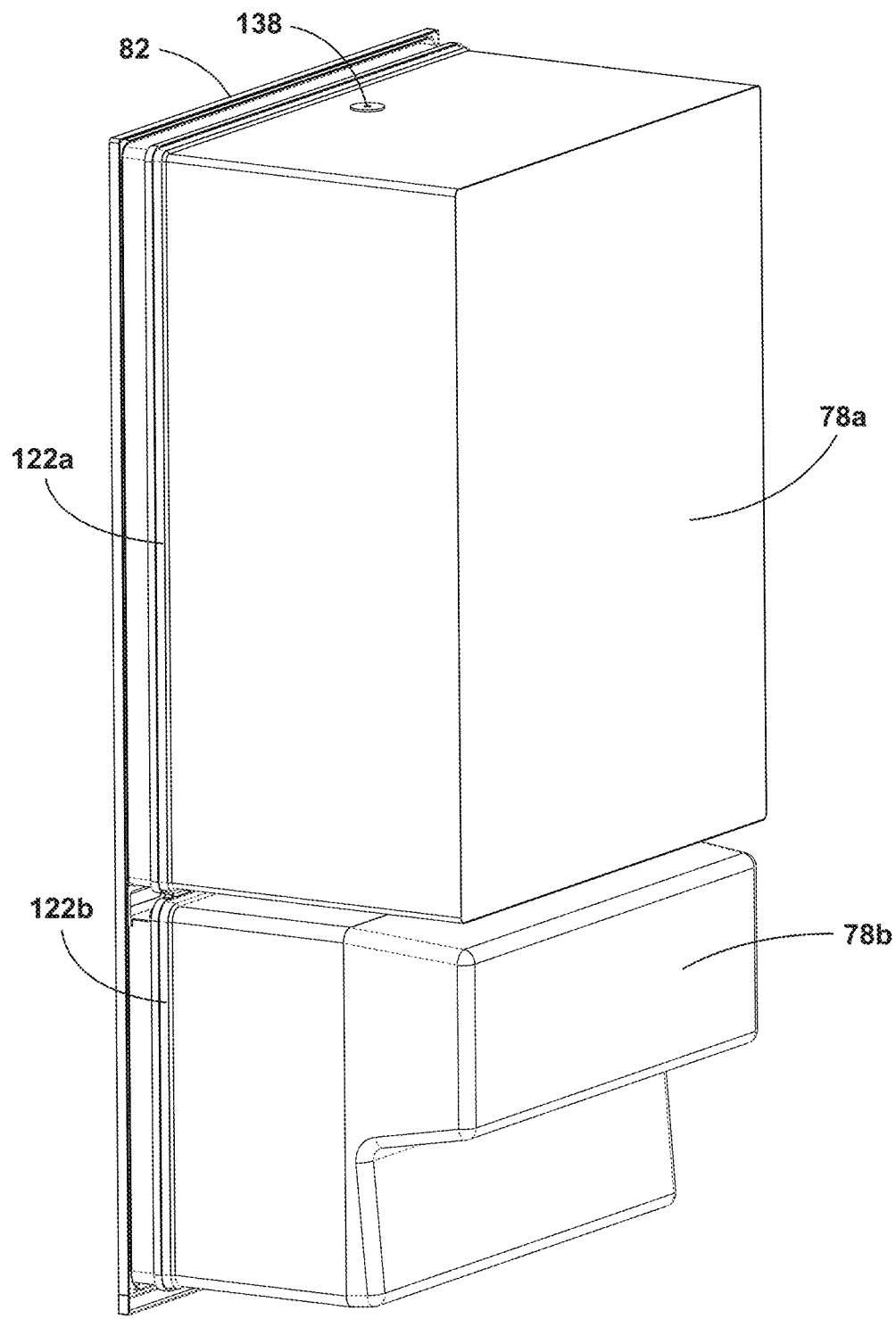
FIG. 3 is a rear side isometric view of a refrigerator liner and a freezer liner attached to an insulating thermal bridge according to one aspect of the present disclosure.

Referring now to FIG. 3, the refrigerator liner 78a and the freezer liner 78b are coupled to the insulating thermal bridge 82 at the second edges 122a and 122b (see also FIG. 2). In some embodiments, a vacuum port 138 may be positioned in the refrigerator liner 78a in order to evacuate the cavity 100 (FIG. 1) having a filler insulation material 146 (FIG. 5).

Figure 4:
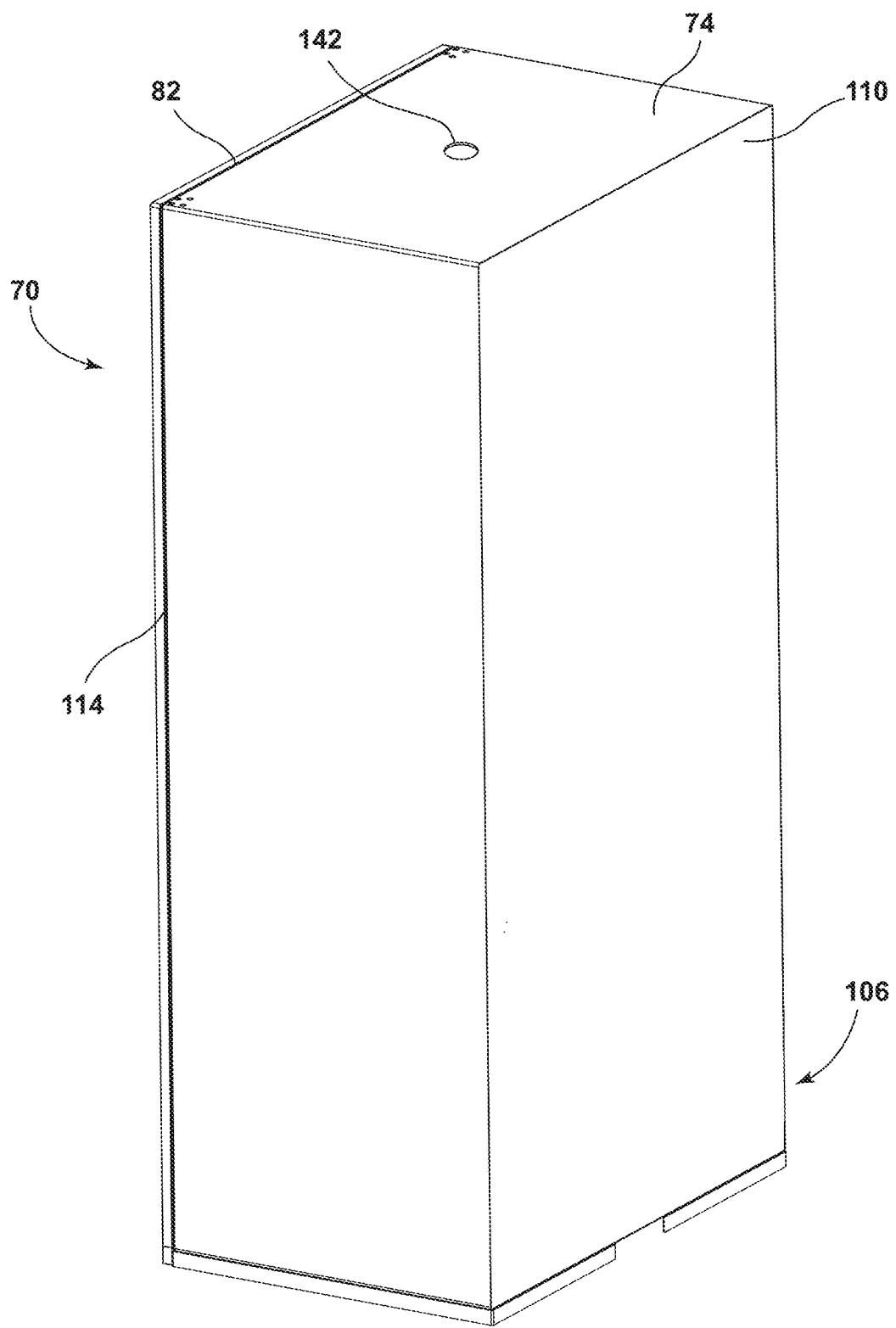
FIG. 4 is a rear isometric view of a vacuum insulated cabinet structure according to one aspect of the present disclosure.

Referring now to FIG. 4, the vacuum insulated structure 70 includes the wrapper 74 coupled to the thermal bridge 82 through the first side edge 114. A fill hole 142 is shown positioned in the top surface of the wrapper 74 where the aperture exit 62 of the auger feeder 10 can be coupled to load a dry and degassed filler insulation material to the cavity 100 (FIG. 1) of the vacuum insulated structure 70 (As shown in FIGS. 5-6). The positioning of the fill hole 142 is not meant to be limiting and the fill hole 142 may be positioned in any surface of the wrapper 74 or liner 78 to load the dry and degassed filler insulation material using the auger feeder 10. In some embodiments, the fill hole 142 may be positioned in the top, back, and/or side walls of the wrapper 74. In some embodiments, there may be more than one fill hole 142, for example, separate fill holes 142 for the refrigerator and freezer compartments 90, 94.

Figure 5:
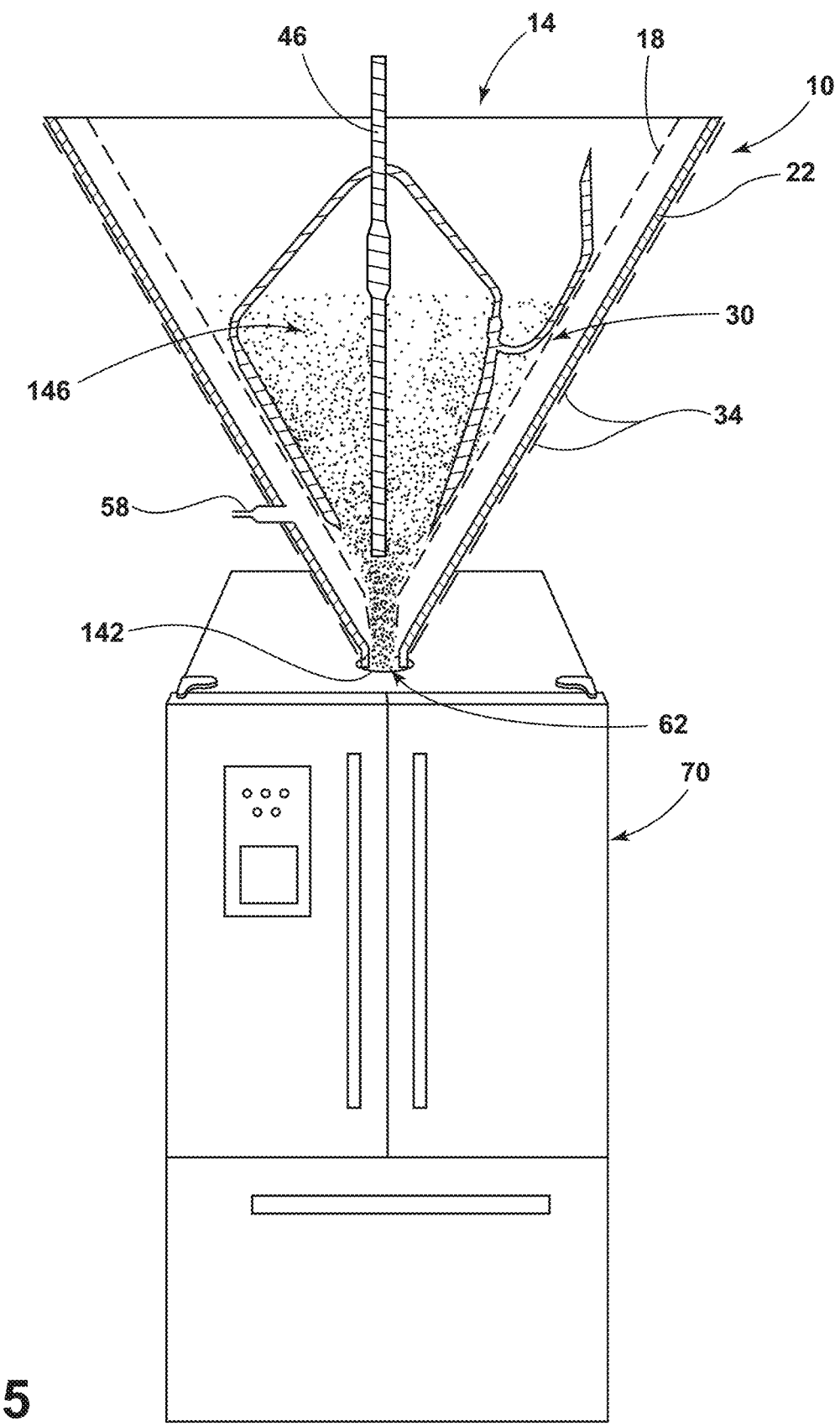
FIG. 5 is a schematic cross-sectional view of an auger feeder having a heater positioned on an outer hopper wall filling a vacuum insulated cabinet structure according to one aspect of the present disclosure.
Figure 6:
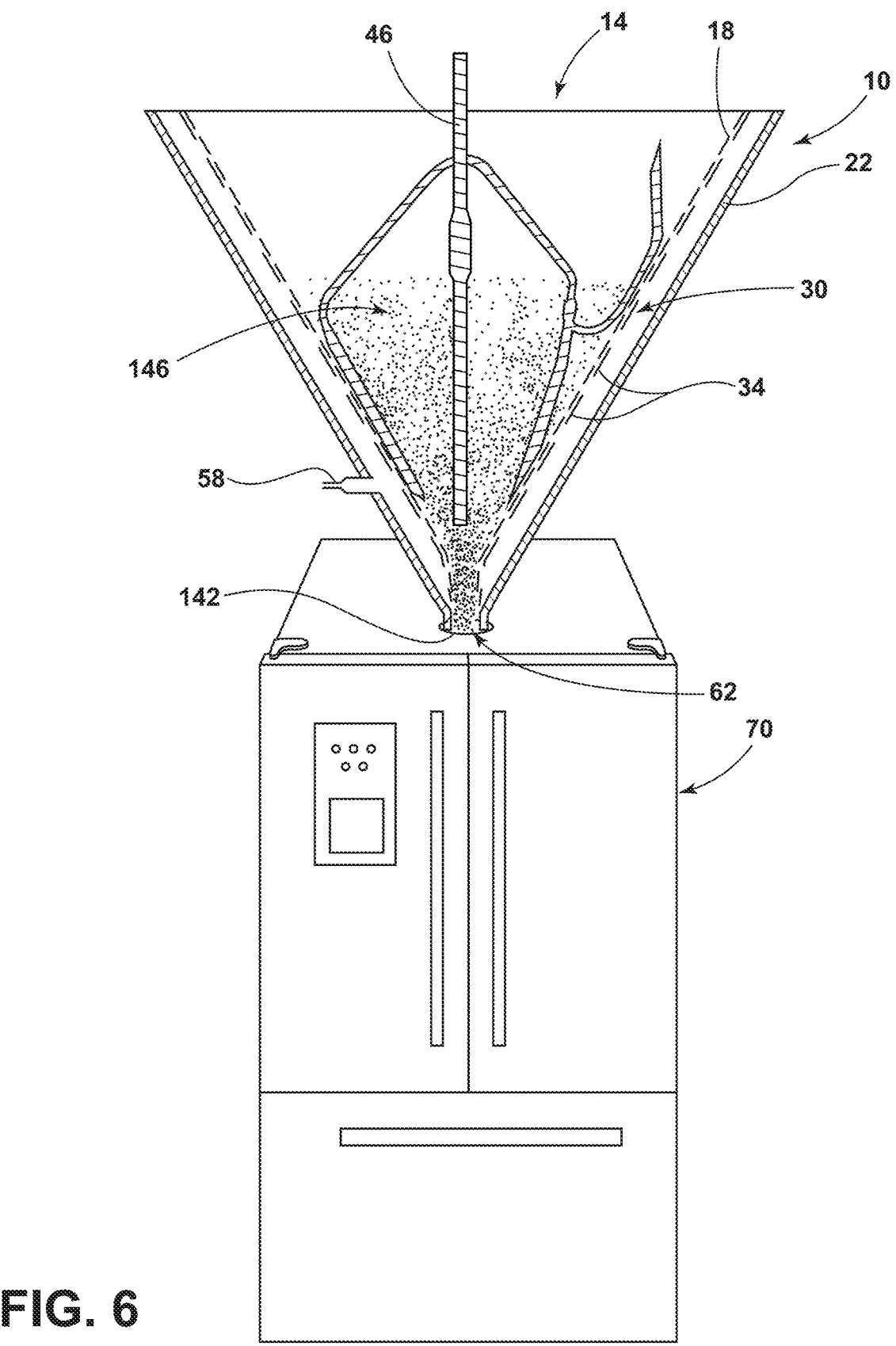
FIG. 6 is a schematic cross-sectional view of an auger feeder having a heater coupled to an inner hopper wall filling a vacuum insulated cabinet structure according to one aspect of the present disclosure.

Referring now to FIGS. 5-6, the auger feeder 10 is shown with the hopper 14 having the inner hopper wall 18 and the outer hopper wall 22. The inner hopper wall 18 is configured to support the filler insulation material 146. The filler insulation material 146 can undergo a baking process to help remove moisture prior to insertion of the dry filler insulation material into the vacuum insulated structure 70. The auger feeder 10 may include the feed screw 46 positioned within the inner hopper wall 18 which is configured to both mix and move the filler insulation material 146 toward the aperture exit 62 at the bottom 66 of the auger feeder 10. The inner hopper wall 18 may be permeable to air such that an evacuator may be drawn to the auger feeder 10 through the vacuum port 58. The moisture on the filler insulation material 146 may be drawn through the inner hopper wall 18 and into the space 30 between the inner hopper wall 18 and the outer hopper wall 22. The inner hopper wall 18 includes the air permeable surface 26 and may additionally include an air permeable membrane and/or a filter to prevent the filler insulation material 146 from moving through the inner hopper wall 18. A heater 34 is depicted as being coupled to the outer hopper wall 22. The heater 34 may be configured to heat the filler insulation material 146 to a temperature of about 100° C. or greater to prevent the filler insulation material 146 from absorbing moisture as well as removing any remaining moisture coupled to its surface. The auger feeder 10 may be coupled to the vacuum insulated structure 70 through the aperture exit 62 such that the heated and dewatered filler insulation material 146 (or dry filler insulation material) may pass through the aperture exit 62 directly into the vacuum insulated structure 70 through the fill hole 142 (FIG. 4).

As used herein, the term "evacuator" is defined to include any means or device for applying a vacuum. In some embodiments, the evacuator may include, for example, an osmotic pump, rotary vane pump, diaphragm pump, piston pump, scroll pump, suction pump, or any other known method to one skilled in the art to provide a vacuum.

The filler insulation material 146 may be formed from various porous/permeable filler materials such as open cell foam, glass fibers, silica, or other suitable materials. In some aspects, the filler insulation material 146 may be a fumed silica or a silica powder. After storage at room temperature or other non-environmentally controlled conditions, the filler insulation material 146 will have a certain amount of adsorbed water on the surface and pores of the fumed silica or other filler insulation material 146. In typical packing processes used for vacuum insulated structures 70, the filler insulation material 146 is added directly from the packaging as shipped to the cavity 100 (FIG. 1) of the vacuum insulated structures 70 and a vacuum with heat is applied to the vacuum insulated structures 70 itself. Such loading or packing processes are inefficient and take considerable amounts of time because the loaded water on the filler insulation material 146 must be drawn off before desired vacuum levels can be obtained. The heated vacuum auger feeder 10 disclosed herein can greatly improve the loading of filler insulation material 146 into the vacuum insulated structure 70 since it can help remove the adsorbed water from the filler insulation material 146 before it is inserted into the cavity 100. The subsequent application of vacuum to the cavity 100 of the vacuum insulated structure 70 can be performed in less time than without the heated vacuum auger feeder 10.

The temperature applied to the filler insulation material 146 by the heater 34 positioned on the inner hopper wall 18, as shown in FIG. 6, and/or outer hopper wall 22, as shown in FIG. 5, may be a temperature of greater than about 75° C., greater than about 100° C., greater than about 125° C., greater than about 150° C., greater than about 175° C., greater than about 200° C., greater than about 250° C., or greater than about 300° C. The first vacuum applied to the filler insulation material 146 by the evacuator in the auger feeder 10 may be less than about 1.0 atm, less than about 0.75 atm, less than about 0.50 atm, less than about 0.25 atm, less than about 0.1 atm, less than about 0.01 atm, or less than about 0.001 atm. In some aspects, the first vacuum applied to the filler insulation material 146 by the evacuator in the auger feeder 10 may be between about 1.0 atm and about 0.1 atm, between about 1.0 atm and about 0.01 atm, between about 1.0 atm and about 0.001 atm, between about 1.0 atm and about 0.0001 atm, between about 0.1 atm and about 0.01 atm, and between about 0.01 atm and about 0.001 atm. In some aspects, the temperature and reduced pressure applied to the filler insulation material 146 may be greater than about 100° C. and less than 1.0 atm. In other aspects, the temperature and reduced pressure applied to the filler insulation material 146 may be greater than about 200° C. and less than 0.25 atm.

As the filler insulation material 146 is exposed to the vacuum and heat of the auger feeder 10, the amount of adsorbed water on the filler insulation material 146 is reduced. In some aspects, the amount of adsorbed water on the filler insulation material 146 may be reduced by at least 25 wt %, at least 50 wt %, at least 75 wt %, at least 80 wt %, at least 90 wt %, at least 95 wt %, at least 98 wt %, and/or at least 99 wt % by applying the heat and vacuum imparted by the auger feeder 10. After exposure to the vacuum and heat of the auger feeder 10, the processed filler insulation material 146 can be categorized as the dry and degassed filler insulation material. The dry and degassed vacuum insulation material may have a moisture and/or water content of less than 2 wt %, less than 1 wt %, less than 0.1 wt %, less than 0.01 wt %, or less than 0.001 wt %.

As the filler insulation material 146 is exposed to the vacuum and heat of the auger feeder 10, the amount of gases adsorbed on the filler insulation material 146 is reduced. In some aspects, the amount of adsorbed gas on the filler insulation material 146 may be reduced by at least 25 wt %, at least 50 wt %, at least 75 wt %, at least 80 wt %, at least 90 wt %, at least 95 wt %, at least 98 wt %, and/or at least 99 wt % by applying the heat and vacuum imparted by the auger feeder 10. After exposure to the vacuum and heat of the auger feeder 10, the processed filler insulation material 146 can be categorized as the dry and degassed filler insulation material.

Figure 7:
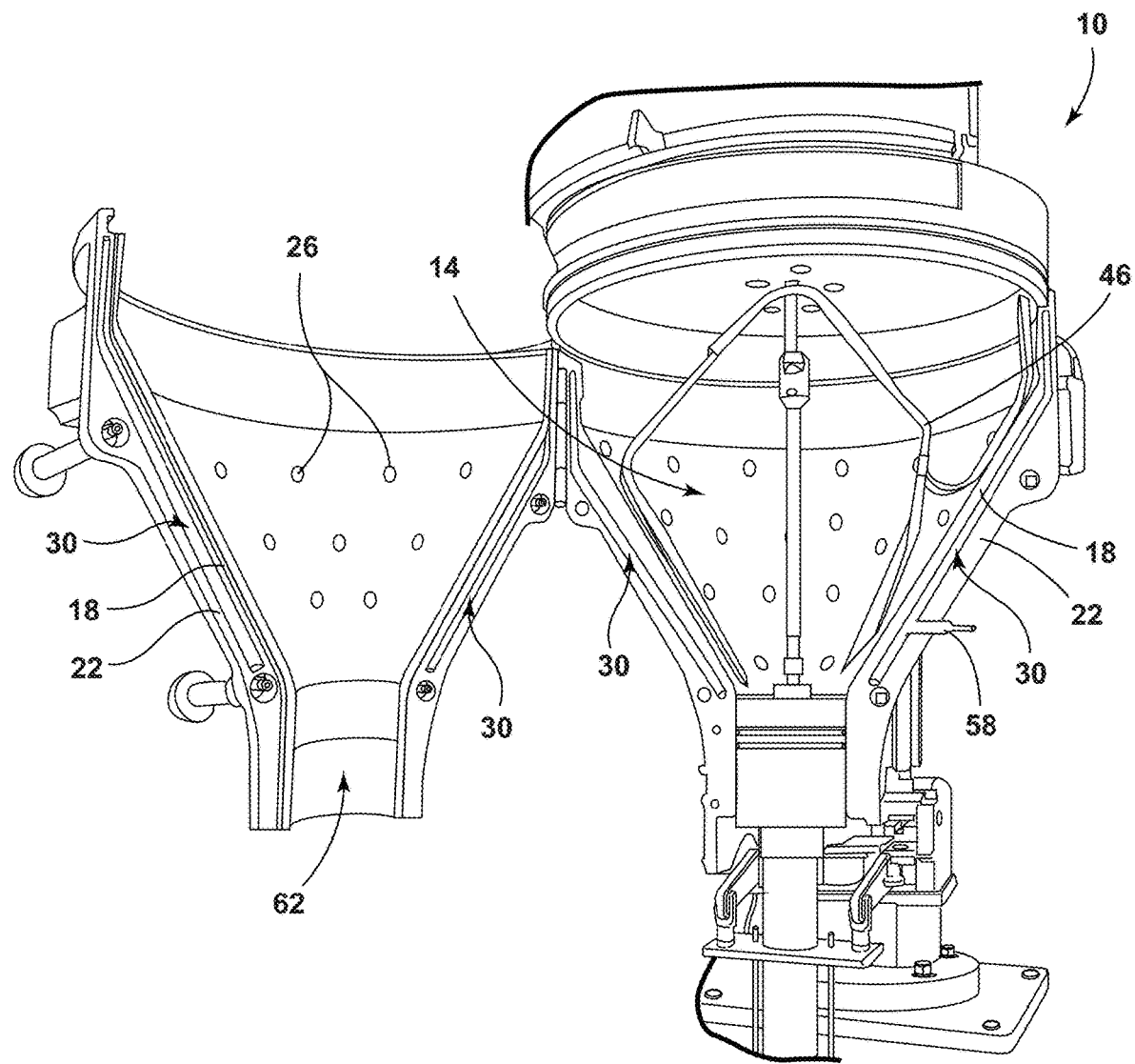
FIG. 7 is a front isometric view of an auger feeder according to one aspect of the present disclosure.

Referring now to FIG. 7, one aspect of the auger feeder 10 is provided. The auger feeder 10 includes the hopper 14 having the inner hopper wall 18 and the outer hopper wall 22 enclosing the space 30 that may have the evacuator applied. The inner hopper wall 18 includes the air permeable surface 26 which in some aspects may include a plurality of holes as shown. The feed screw 46 is coupled to the auger feeder 10 to both mix and drive the filler insulation material 146 to the aperture exit 62 so that the resultant dry filler insulation material may be loaded into the cavity 100 (FIG. 1) of the vacuum insulated structure 70. In some aspects, the plurality of holes in the air permeable surface 26 may have an average diameter of less than 750 μm, less than 500 μm, less than 400 μm, less than 300 μm, less than 200 μm, less than 100 μm, or less than 50 μm.

Figure 8:
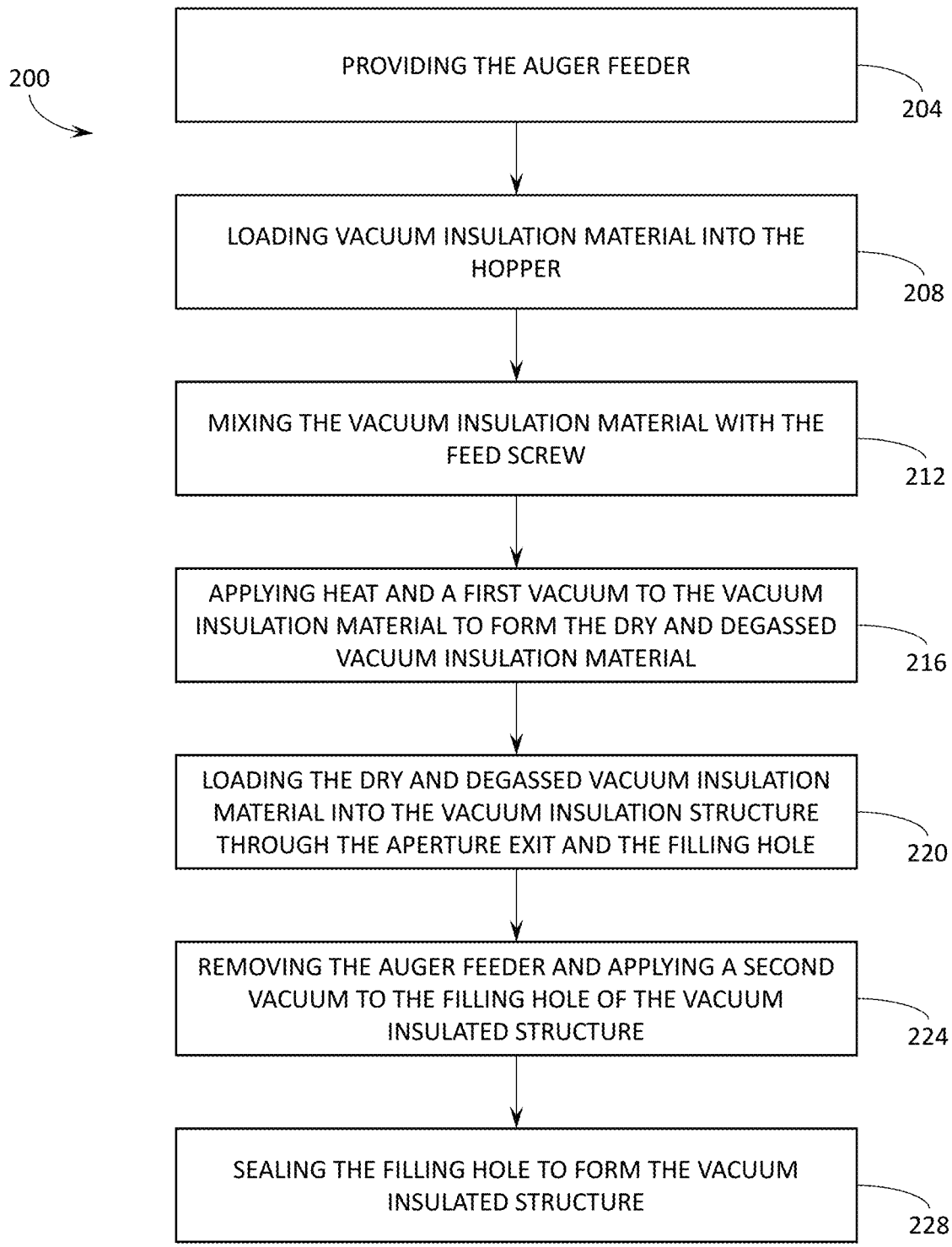
FIG. 8 is a flow diagram of a method for drying and loading a filler insulation material into a vacuum insulated structure according to one aspect of the present disclosure.

Referring now to FIG. 8, with continued reference to FIGS. 1-7, a method 200 for drying and loading the filler insulation material 146 to the vacuum insulated structure 70 is shown. The method 200 may begin with a step 204 that includes providing the auger feeder 10 having the hopper 14 including the inner hopper wall 18 and the outer hopper wall 22 wherein the inner hopper wall 18 includes an air permeable surface 26. The auger feeder 10 additionally includes the space 30 positioned between the inner and outer hopper walls 18, 22 and the heater 34 coupled to the outside edge 38 of the inner hopper wall 18 or the outside edge 42 of the outer hopper wall 22. The auger feeder 10 additionally includes the feed screw 46 positioned along the inside edge 50 of the inner hopper wall 18 and the evacuator coupled to the vacuum port 58 positioned in the outer hopper wall 22. Lastly, the auger feeder 10 includes the aperture exit 62 positioned at the bottom 66 of the inner and outer hopper walls 18, 22.

Next is a step 208 of loading the vacuum insulation material 146 into the hopper 14. In some aspects, the vacuum insulation material 146 may include a fumed silica.

Next is a step 212 of mixing the vacuum insulation material 146 with the feed screw 46. In some aspects, the feed screw 46 may be a mixing paddle and in other aspects the feed screw 46 may be a helical blade positioned along the inner hopper wall 18. Regardless of the shape and mechanics of the feed screw 46, the vacuum insulation material 146 is mixed along the inner hopper wall 18 in order to make contact with the air permeable surface 26.

Next is a step 216 of applying heat and a first vacuum to the vacuum insulation material 146 to form the dry and degassed vacuum insulation material. The first vacuum applied to the vacuum insulation material 146 in the hopper 14 may be less than about 1.0 atm, less than about 0.9 atm, less than about 0.8 atm, less than about 0.7 atm, less than about 0.6 atm, less than about 0.5 atm, less than about 0.4 atm, less than about 0.3 atm, less than about 0.2 atm, or less than about 0.1 atm. In some aspects, the first vacuum applied to the filler insulation material 146 by the evacuator in the hopper 14 of the auger feeder 10 may be between about 1.0 atm and about 0.1 atm, between about 1.0 atm and about 0.01 atm, between about 1.0 atm and about 0.001 atm, between about 1.0 atm and about 0.0001 atm, between about 0.1 atm and about 0.01 atm, and between about 0.01 atm and about 0.001 atm.

Next is a step 220 of loading the dry and degassed vacuum insulation material into the vacuum insulation structure 70 through the aperture exit 62 and the filling hole 142.

Next is a step 224 of removing the auger feeder 10 and applying a second vacuum to the filling hole 142 of the vacuum insulated structure 70. The second vacuum applied to the cavity 100 of the vacuum insulated structure 70 may be less than about 1.0 atm, less than about 0.9 atm, less than about 0.8 atm, less than about 0.7 atm, less than about 0.6 atm, less than about 0.5 atm, less than about 0.4 atm, less than about 0.3 atm, less than about 0.2 atm, less than about 0.1 atm, less than about 0.01 atm, or less than about 0.001 atm. In some aspects, the pressure applied from the first vacuum is less than the pressure applied from the second vacuum.

Next is a step 228 of sealing the filling hole 142 to form the vacuum insulated structure 70. In some aspects, the fill hole 142 may be closed by pinching the fill hole 142 closed, added a plug, soldering on a cover (not shown), or other means of closing a hole known to one skilled in the art.

It is understood that the descriptions outlining and teaching the auger feeder 10 previously discussed, which can be used in any combination, apply equally well to the method 200 for drying and loading the filler insulation material 146 to the vacuum insulated structure 70.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

LISTING OF NON-LIMITING EMBODIMENTS

Embodiment A is an auger feeder comprising: a hopper having an inner hopper wall and an outer hopper wall wherein the inner hopper wall includes an air permeable surface; a space positioned between the inner and outer hopper walls; a heater coupled to an outside edge of the inner hopper wall or an outside edge of the outer hopper wall; a feed screw positioned along an inside edge of the inner hopper wall; an evacuator coupled to a vacuum port positioned in the outer hopper wall; and an aperture exit positioned at the bottom of the inner and outer hopper walls.

The auger feeder of Embodiment A wherein the aperture exit is configured to couple to a vacuum insulated structure.

The auger feeder of Embodiment A or Embodiment A with any of the intervening features wherein a filler insulation material is added to the hopper.

The auger feeder of Embodiment A or Embodiment A with any of the intervening features wherein the air permeable surface comprises a permeable membrane.

The auger feeder of Embodiment A or Embodiment A with any of the intervening features wherein the inner hopper wall comprises a plurality of holes having a diameter less than 300 µm.

The auger feeder of Embodiment A or Embodiment A with any of the intervening features wherein the heater is coupled to the outside edge of the inner hopper wall.

The auger feeder of Embodiment A or Embodiment A with any of the intervening features wherein the heater is coupled to an outside edge of the outer hopper wall.

Embodiment B is a method for drying and loading a filler insulation material into a vacuum insulated structure (VIS), the method comprising: providing an auger feeder comprising: a hopper having an inner hopper wall and an outer hopper wall wherein the inner hopper wall includes an air permeable surface; a space positioned between the inner and outer hopper walls; a heater coupled to an outside edge of the inner hopper wall or an outside edge of the outer hopper wall; a feed screw positioned along an inside edge of the inner hopper wall; an evacuator coupled to a vacuum port positioned in the outer hopper wall; and an aperture exit positioned at the bottom of the inner and outer hopper walls. The method of Embodiment B further includes loading the vacuum insulation material to the hopper; mixing the vacuum insulation material with the feed screw; applying heat and a first vacuum to the vacuum insulation material to form a dry and degassed vacuum insulation material; loading the dry and degassed vacuum insulation material into the vacuum insulated structure through the aperture exit and a loading port; removing the auger feeder and applying a second vacuum to the loading port of the vacuum insulated structure; and sealing the loading port to form the vacuum insulated structure.

The method of Embodiment B wherein applying heat is carried out at a temperature of at least 100° C.

The method of Embodiment B or Embodiment B with any of the intervening features wherein the first vacuum is applied at a pressure between about 1.0 atm and about 0.01 atm.

The method of Embodiment B or Embodiment B with any of the intervening features wherein the second vacuum is applied at a pressure less than 0.001 atm.

The method of Embodiment B or Embodiment B with any of the intervening features further comprising: vibrating the vacuum insulated structure as the dry and degassed vacuum insulation material is loaded through the aperture exit and the loading port.

The method of Embodiment B or Embodiment B with any of the intervening features wherein the dry and degassed vacuum insulation material has a moisture content of less than 2 wt %.

The method of Embodiment B or Embodiment B with any of the intervening features wherein the air permeable surface comprises a plurality of holes and a permeable membrane.

Embodiment C is an apparatus for drying and loading a filler insulation material into a vacuum insulated structure comprising: a hopper having an inner hopper wall and an outer hopper wall wherein the inner hopper wall includes an air permeable surface; a space positioned between the inner and outer hopper walls; a heater coupled to an outside edge of the inner hopper wall or an outside edge of the outer hopper wall; a feed screw positioned along an inside edge of the inner hopper wall; an evacuator coupled to a vacuum port positioned in the outer hopper wall; and an aperture exit positioned at the bottom of the inner and outer hopper walls.

The apparatus of Embodiment C wherein the air permeable surface comprises a permeable membrane.

The apparatus of Embodiment C or Embodiment C with any of the intervening features wherein the inner hopper wall comprises a plurality of holes having a diameter less than 300 μm.

The apparatus of Embodiment C or Embodiment C with any of the intervening features wherein the heater is coupled to the outside edge of the inner hopper wall.

The apparatus of Embodiment C or Embodiment C with any of the intervening features rein the heater is coupled to an outside edge of the outer hopper wall.

The apparatus of Embodiment C or Embodiment C with any of the intervening features wherein the filler insulation material is a fumed silica having an average particle size of 5 μm.

What is claimed is:

1. An auger feeder comprising:
   a hopper having an inner hopper wall and an outer hopper wall coupled with and spaced from the inner hopper wall to define a space therebetween, wherein the inner hopper wall includes an air permeable surface;
   a heater coupled to the hopper for heating contents of the hopper;
   a feed screw positioned along an inside edge of the inner hopper wall;
   an evacuator coupled to a vacuum port positioned in the outer hopper wall; and
   an aperture exit positioned at a bottom of the inner and outer hopper walls.

2. The auger feeder of claim 1, wherein the aperture exit is configured to couple to a vacuum insulated structure.

3. The auger feeder of claim 1, wherein the contents include a filler insulation material.

4. The auger feeder of claim 1, wherein the inner hopper wall is joined with the outer hopper wall adjacent to the bottom.

5. The auger feeder of claim 1, wherein the inner hopper wall is joined with the outer hopper wall adjacent to an upper portion of the hopper.

6. The auger feeder of claim 1, wherein the heater is coupled to an outside edge of the inner hopper wall.

7. The auger feeder of claim 1, wherein the heater is coupled to an outside edge of the outer hopper wall.

8. A method for drying and loading a filler insulation material into a vacuum insulated structure, the method comprising:
   loading the filler insulation material to a hopper having an inner hopper wall and an outer hopper wall spaced from the inner hopper wall to define a space therebetween;
   mixing the filler insulation material with a feed screw disposed in the hopper;
   heating the filler insulation material via a heater coupled with the hopper;
   applying a first vacuum to the filler insulation material via an evacuator coupled to a vacuum port positioned on the outer hopper wall; and
   loading the filler insulation material into the vacuum insulated structure through an aperture exit positioned at a bottom of the inner and outer hopper walls.

9. The method of claim 8, further comprising:
   removing an auger feeder and applying a second vacuum to a loading port of the vacuum insulated structure.

10. The method of claim 9, further comprising:
    sealing the loading port to form the vacuum insulated structure.

11. The method of claim 9, further comprising:
    vibrating the vacuum insulated structure as dry and degassed filler insulation material is loaded through the aperture exit and the loading port.

12. The method of claim 8, wherein the inner hopper wall is joined with the outer hopper wall adjacent to the bottom.

13. The method of claim 8, wherein the inner hopper wall is joined with the outer hopper wall adjacent to an upper portion of the hopper.

14. The method of claim 8, wherein the evacuator is in fluid communication with the filler insulation material via the space and the air permeable surface.

15. An apparatus for drying and loading a filler insulation material into a vacuum insulated structure comprising:
- a hopper having an inner hopper wall and an outer hopper wall coupled with and spaced from the inner hopper wall defining a space therebetween, wherein the inner hopper wall includes an air permeable surface;
- a heater coupled to an outside edge of the inner hopper wall or an outside edge of the outer hopper wall;
- an evacuator coupled to a vacuum port positioned in the outer hopper wall; and
- an aperture exit positioned at a bottom of the inner and outer hopper walls.

16. The apparatus of claim 15, wherein the inner hopper wall is joined with the outer hopper wall adjacent to a lower portion of the hopper.

17. The apparatus of claim 15, wherein the inner hopper wall is joined with the outer hopper wall adjacent to an upper portion of the hopper.

18. The apparatus of claim 15, wherein the heater is coupled to the outside edge of the inner hopper wall.

19. The apparatus of claim 15, wherein the heater is coupled to the outside edge of the outer hopper wall.

20. The apparatus of claim 15, further comprising:
- a feed screw positioned in the hopper for mixing the filler insulation material.

* * * * *